July 3, 1923.
R. S. BASSETT
LIQUID METER
Filed June 1, 1921
1,460,471
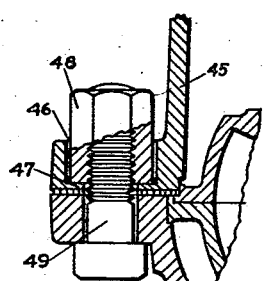
Fig. 5.
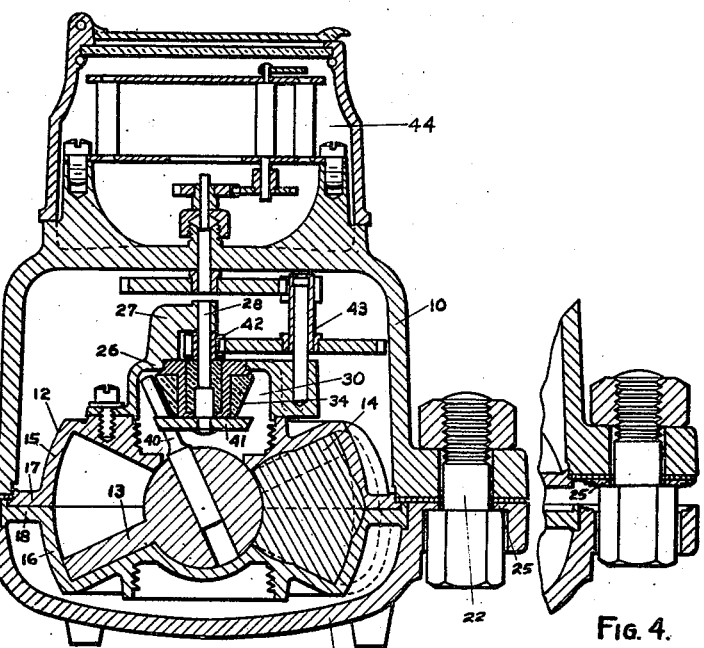
Fig. 1.
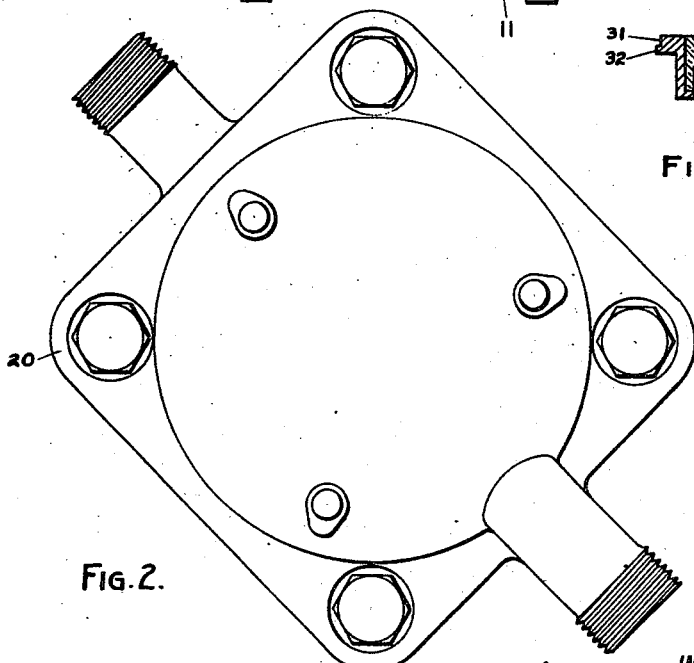
Fig. 2.
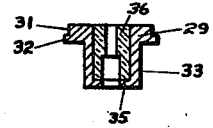
Fig. 4.
Fig. 3.
INVENTOR
Robert S. Bassett Patented July 3, 1923.

1,460,471

UNITED STATES PATENT OFFICE.

ROBERT S. BASSETT, OF BUFFALO, NEW YORK.

LIQUID METER.

Application filed June 1, 1921. Serial No. 474,150.

*To all whom it may concern:*

Be it known that I, ROBERT S. BASSETT, a citizen of the United States of America, and a resident of the city of Buffalo, county of Erie, and State of New York, have invented certain new and useful Improvements in Liquid Meters, of which the following is a full, clear, and exact description.

My invention relates generally to meters used in the measurement of liquids and more particularly to the disc type of meter.

The principal object of my invention has been to provide an interchangeable driver pinion shaft bushing, which can be accurately machined at the factory and conveniently installed as a repair part where the meters are being used.

Another object has been to provide such a bushing which will also act as a roller post and thrust bearing, so that when the bearing for the driver pinion shaft is renewed the roller post and thrust bearing will also be renewed.

Another object has been to provide a bushing which may be inserted into the gear plate from the bottom thereof, thus preventing an upward, axial movement of the bushing when undue pressure is caused in the disc pin recess of the meter, as, for instance, by the partial or complete freezing of the liquid in the meter. Another advantage resulting from this construction is that the gear plate may be provided with an integral overhanging arm, which permits perfect alinement of the bearings of the driver pinion shaft. This also reduces the number of parts and simplifies the construction.

Another object has been to provide a meter of such a design that minimum damage will be caused to the meter by the freezing of the liquid which it contains.

My meter is so designed that a predetermined less expensive part will fail thus releasing the internal measuring mechanism from its fixed position, without damage thereto.

Another object has been to provide a bearing insert made of suitable bearing material mounted in a metallic bushing which is so formed that it will positively hold the bearing insert against downward axial displacement, relative to the bushing.

The above objects and advantages have been accomplished by the device shown in the accompanying drawings of which:

Fig. 1 shows a longitudinal, sectional view through my complete device.

Fig. 2 shows a bottom view thereof.

Fig. 3 is a sectional elevation of my improved bushing, with its insert.

Fig. 4 shows a fragmentary, sectional view of the yieldable part of the meter after it has been broken by abnormal pressure of the liquid contained with the meter.

Fig. 5 shows a fragmentary, sectional elevation of a modified form of casing which shows the top casing designed to yield under abnormal pressures.

In the drawings, 10 represents the top casing and 11 the bottom casing. 12 is the disc chamber, which is of the usual and well known type, having a disc 13 and a diaphragm 14. The disc chamber comprises an upper part 15 and a lower part 16. Each of the parts 15 and 16 is provided with a suitable flange 17 and 18, respectively. The flange 17 rests upon the flange 18, which latter flange is preferably mounted in a counterbored recess in the bottom casing 11, whereby, when the bottom casing is forced downwardly and released by an abnormal pressure within the meter, such as freezing of the liquid, the measuring mechanism will be allowed to move from its fixed position without injuring the same. Since the parts 15 and 16 of the disc chamber are not fastened together, it will be obvious that these two parts will also be free to separate when freezing occurs.

The top casing 10 is provided with a flange 19 and the bottom casing 11 is likewise provided with a flange 20. These flanges preferably extend around the casing parts and arranged between them is a gasket 21. The bolts 22, for holding the parts of the casing together, will pass through the flanges and gasket at suitable intervals.

Arranged above the disc chamber and supported by the part 15 thereof is the gear plate 26 of the meter. The gear plate is provided with an overhanging arm 27 which forms a bearing for the upper end of the driver pinion shaft 28. 29 is the driver pinion shaft bushing which is mounted in the gear plate and projects downwardly into the recess 30 thereof. The bushing 29 is made preferably of tough material, such as may be accurately machined to specific sizes. It is provided with an outer diametrical portion 31 which is preferably knurled on its surface so that it may be pressed into the aperture made for it in the gear plate. Below the cylindrical portion 31 is a flange 32, which serves as a stop to prevent upward dislocation of the bushing, and brings it to a definite position in the gear plate. The lower portion 33 is of such a diameter as to provide a bearing and support for the disc pin roller 34. The under side of the flange 32 provides a thrust bearing for the roller. The bushing 29 is counterbored, whereby a lower supporting flange 35 is provided. Mounted within the counterbore is a bearing insert 36, which may be of any material suitable for the liquids being handled by the meter. As is well known, gutta percha is one of the best bearing materials for use in connection with water, and the insert 36 is preferably made of this material. Where the entire bushing is made of gutta percha, it has to be of considerable size due to the fragile nature of the material, and when made of such a size the expansion and contraction is such that it is impossible to hold it satisfactorily in place within the gear plate. By making the bushing of tough material with a bearing insert, it is possible to make the bearing insert comparatively small. Since this work can be done where the meters are manufactured, it can be accurately and carefully performed, and the insert may be given the proper diameter so that it may be securely forced into the bushing. When thus completed, the bushing with its insert makes a very durable unit, which may be used as a repair part and may be inserted by the user without danger of breakage. Furthermore, when inserted, there is no danger of the bushing becoming loose and falling out due to expansion or contraction. If the insert should become loose due to temperature changes, the lower supporting flange 35 would retain the same in position. It is well known that in this type of meter, the support for the disc pin roller wears very rapidly. In my invention this roller support, being an integral part of the bushing, is renewed simultaneously with the renewal of the bushing, thus reducing the number of parts in the metering construction and making renewals more inexpensive and easier to make.

40 is the disc pin, of the usual design, which engages with the driver arm 41. This driver arm is carried at the lower end of the driver pinion shaft 28 and is rotated by the disc pin in the well known manner. Carried by the shaft 28 is the driver pinion 42 which is connected with a train of gears 43 of the usual and well known type. Mounted on top of the top casing 10 is the registering device 44 of my meter. This registering device with its connected gearing is common and well known in the art and will not, therefore, be further described.

Obviously, some modifications of the details herein shown and described may be made without departing from the spirit of my invention, or the scope of the appended claims; and I do not, therefore, wish to be limited to the exact embodiment herein shown and described, the form described being merely a preferred embodiment thereof.

Having thus described my invention, what I claim is:

1. In a liquid meter, the combination with a gear plate, of a driver pinion shaft bushing engageable with and supported by the gear plate, and comprising a metallic shell, an internal insert supporting flange and a bearing insert supported by said flange substantially as and for the purpose described.

2. In a liquid meter, the combination with a gear plate, of a driver pinion shaft bushing comprising a cylindrical part engageable with the gear plate, a shoulder beneath the cylindrical part for engagement with the underside of the gear plate, an insert supporting flange and a bearing insert carried by the bushing substantially as and for the purpose described.

3. In a liquid meter, the combination with an apertured gear plate, of a driver pinion shaft bushing comprising a cylindrical part engageable with the aperture in the gear plate, a roller thrust shoulder and an internal insert supporting flange, and a bearing insert carried by the bushing substantially as and for the purpose described.

4. In a liquid meter, the combination with an apertured gear plate, of a driver pinion shaft bushing, means carried by the plate for supporting said bushing against downward axial displacement and an overhanging arm forming an integral part of said gear plate, said overhanging arm comprising a bearing axially concentric with said driver pinion shaft bushing substantially as and for the purpose described.

In testimony whereof, I have hereunto signed my name.

ROBT. S. BASSETT.